(12) United States Patent
Eberhardt et al.

(10) Patent No.: US 10,840,782 B2
(45) Date of Patent: Nov. 17, 2020

(54) ASSEMBLY AND METHOD FOR CONNECTING ENDS OF GENERATOR STATOR COILS WITH MANIFOLD

(71) Applicants: Siemens Energy, Inc., Orlando, FL (US); Siemens Aktiengesellschaft, Münich (DE)

(72) Inventors: Nicholas Eberhardt, Oviedo, FL (US); Stefan Dunkel, Sonsbeck (DE)

(73) Assignee: SIEMENS ENERGY, INC., Orlando, FL (US)

( * ) Notice: Subject to any disclaimer, the term of this patent is extended or adjusted under 35 U.S.C. 154(b) by 532 days.

(21) Appl. No.: 15/647,445

(22) Filed: Jul. 12, 2017

(65) Prior Publication Data

US 2019/0020250 A1    Jan. 17, 2019

(51) Int. Cl.
| | |
|---|---|
| *H02K 15/00* | (2006.01) |
| *H02K 15/02* | (2006.01) |
| *H02K 3/52* | (2006.01) |
| *H02K 1/32* | (2006.01) |
| *H02K 9/197* | (2006.01) |
| *H02K 3/24* | (2006.01) |
| *H02K 3/22* | (2006.01) |

(52) U.S. Cl.
CPC ......... *H02K 15/0093* (2013.01); *H02K 1/32* (2013.01); *H02K 3/22* (2013.01); *H02K 3/24* (2013.01); *H02K 3/521* (2013.01); *H02K 9/197* (2013.01); *H02K 15/0006* (2013.01); *H02K 15/028* (2013.01)

(58) Field of Classification Search
CPC .... H02K 15/0093; H02K 15/028; H02K 1/32; H02K 3/24; H02K 3/521; H02K 9/197; H02K 15/0006; H02K 3/22
USPC .................................. 310/52, 54, 57, 58, 64
See application file for complete search history.

(56) References Cited

U.S. PATENT DOCUMENTS

| | | | |
|---|---|---|---|
| 4,274,021 | A | 6/1981 | Kamiya et al. |
| 4,602,872 | A * | 7/1986 | Emery ..................... G01K 3/02 310/53 |
| 4,808,867 | A | 2/1989 | Wichmann et al. |
| 5,024,249 | A | 6/1991 | Botsolas |
| 5,074,672 | A | 12/1991 | Emery et al. |
| 6,895,653 | B2 | 5/2005 | Shanahan |

(Continued)

FOREIGN PATENT DOCUMENTS

| | | |
|---|---|---|
| CN | 1854648 A | 11/2006 |
| EP | 0209364 A2 | 1/1987 |

(Continued)

*Primary Examiner* — Bernard Rojas (57) ABSTRACT

An assembly and a method for connecting ends of generator stator coils with a manifold are presented. The assembly includes an adapter having a sleeve connection conduit connected to a sleeve of the manifold and two hose connection conduits. Two hoses are connected between the two hose connection conduits and end of top stator coil and end of bottom stator coil respectively. The adapter provides two separate coolant flow paths from one sleeve of the manifold to the top stator coil and the bottom stator coil through two hoses. The assembly provides a simple modification to resolve connection issues between generator stator coils and manifold during stator coil rewinding as well as a possibility to monitor coolant temperatures of top and bottom stator coils independently.

8 Claims, 5 Drawing Sheets

(56) References Cited

U.S. PATENT DOCUMENTS

| | | | | |
|---|---|---|---|---|
| 8,128,126 B2 * | 3/2012 | Poupore | ................ | F16L 41/023 285/131.1 |
| 2004/0103532 A1 * | 6/2004 | Shanahan | ................. | B23P 6/00 29/889.1 |
| 2006/0103261 A1 | 5/2006 | Wang | | |

FOREIGN PATENT DOCUMENTS

| | | | |
|---|---|---|---|
| JP | S5866556 A | 4/1983 | |
| JP | H01177845 A | 7/1989 | |

* cited by examiner

ASSEMBLY AND METHOD FOR CONNECTING ENDS OF GENERATOR STATOR COILS WITH MANIFOLD

TECHNICAL FIELD

The present invention relates generally to an assembly and a method for connecting ends of generator stator coils with a manifold.

DESCRIPTION OF RELATED ART

Generator is a component that coverts mechanical power to electrical power in power generation industry. Generator typically includes a stator and a rotor each comprised of a plurality of electrical conductor coils. During generator operation, generator stator coils may need to be cooled to efficiently remove heat developed by electrical losses. Manifolds are arranged at ends of stator coils for supplying coolant. Ends of stator coils may be connected to a manifold at inlet and to a manifold at outlet through hoses. The coolant may include liquid, such as water. The coolant is fed into one end of stator coils from a manifold at inlet and is collected into a manifold at outlet from an opposite end of stator coils. Such a cooling system is referred to as a single-pass system. Coolant temperatures may be measured by thermal sensors at various locations to monitor operation of stator windings.

Generator stator coils may consist of top stator coils and bottom stator coils. In some generator stator configurations, only one hose is connected to a manifold per pair of top stator coil and bottom stator coil at inlet and outlet respectively. End of the top stator coil and the bottom stator coil may include an end fitting to split the coolant from the one hose to the top stator coil and the bottom stator coil at the inlet and to merge the coolant from the top stator coil and the bottom stator coil into the one hose at the outlet. Thermal sensors mounted at outlet manifold may only measure merged coolant temperature of top stator coils and the bottom stator coils. One sleeve connection is required on the manifolds at inlet and outlet respectively for connecting the one hose for such configurations.

In some generator stator configurations, two hoses may be connected to a manifold per pair of top stator coil and bottom stator coil at inlet and outlet respectively. Coolant is fed into the top stator coil and the bottom stator coil separately through the two hoses. End fittings are not required at each end of the top stator coil and the bottom stator coil. However, twice of many sleeve connections are required on the manifold at inlet and outlet respectively for connecting the two separated hoses for such configurations.

During generator stator coil rewinding of an existing generator stator, design of the rewinding stator coils may be different than the existing stator coils in the existing generator stator. In order to connect hoses between end of stator coils and manifold, either the existing manifold needs to be replaced to adapt the design of the rewinding stator coils, or the design of the rewinding stator coils needs to be changed to adapt the existing manifold. Either method may result in significant financial and labor cost and time consuming.

SUMMARY OF INVENTION

Briefly described, aspects of the present invention relate to an assembly and a method for connecting ends of generator stator coils with a manifold.

According to an aspect, an assembly for connecting an end of a generator stator coil with a manifold is presented. The stator coil comprises a top stator coil and a bottom stator coil. the manifold supplies coolant for cooling the stator coil. The assembly comprises a sleeve connected to the manifold. The assembly comprises an adapter. The adapter comprises a sleeve connection conduit configured to be attached to the sleeve. The adapter further comprises two hose connection conduits. The assembly comprises hoses. The two hoses are configured to be connected between the two hose connection conduits of the adapter and an end of the top stator coil and an end of the bottom stator coil respectively. The adapter is arranged between the sleeve and the two hose for providing two separate coolant flow paths from the sleeve connected to the manifold to the top stator coil and the bottom stator coil through the two hoses.

According to an aspect, a method for connecting an end of a generator stator coil with a manifold is presented. The stator coil comprises a top stator coil and a bottom stator coil. The manifold supplies cooling flow to the stator coil. The method comprises connecting a sleeve to the manifold. The method comprises attaching an adapter to the sleeve. The adapter comprises a sleeve connection conduit configured to be attached to the sleeve. The adapter further comprises two hose connection conduits. The method comprises connecting two hoses between the two hose connection conduits of the adapter and an end of the top stator coil and an end of the bottom stator coil respectively. The adapter is arranged between the sleeve and the two hoses for providing two separate coolant flow paths from the sleeve connected to the manifold to the top stator coil and the bottom stator coil through the two hoses According to an aspect, a method for modifying a manifold connection is presented. The manifold connection is configured to be connected to an end of a generator stator coil comprising a top stator coil and a bottom stator coil. The manifold connection comprises a sleeve connected to a manifold supplying coolant and a hose connected to the sleeve. The method comprises removing the hose from the sleeve. The method comprises attaching an adapter to the sleeve. The adapter comprises a sleeve connection conduit configured to be attached to the sleeve. The adapter further comprises two hose connection conduits; and connecting two hoses to the two hose connection conduits of the adapter. The adapter is arranged between the sleeve and the two hoses for providing two separate coolant flow paths from the sleeve connected to the manifold to the top stator coil and the bottom stator coil through the two hoses.

Various aspects and embodiments of the application as described above and hereinafter may not only be used in the combinations explicitly described, but also in other combinations. Modifications will occur to the skilled person upon reading and understanding of the description.

BRIEF DESCRIPTION OF DRAWINGS

Exemplary embodiments of the application are explained in further detail with respect to the accompanying drawings. In the drawings.

To facilitate understanding, identical reference numerals have been used, where possible, to designate identical elements that are common to the figures.

DETAILED DESCRIPTION OF INVENTION

A detailed description related to aspects of the present invention is described hereafter with respect to the accompanying figures.

Figure 1:
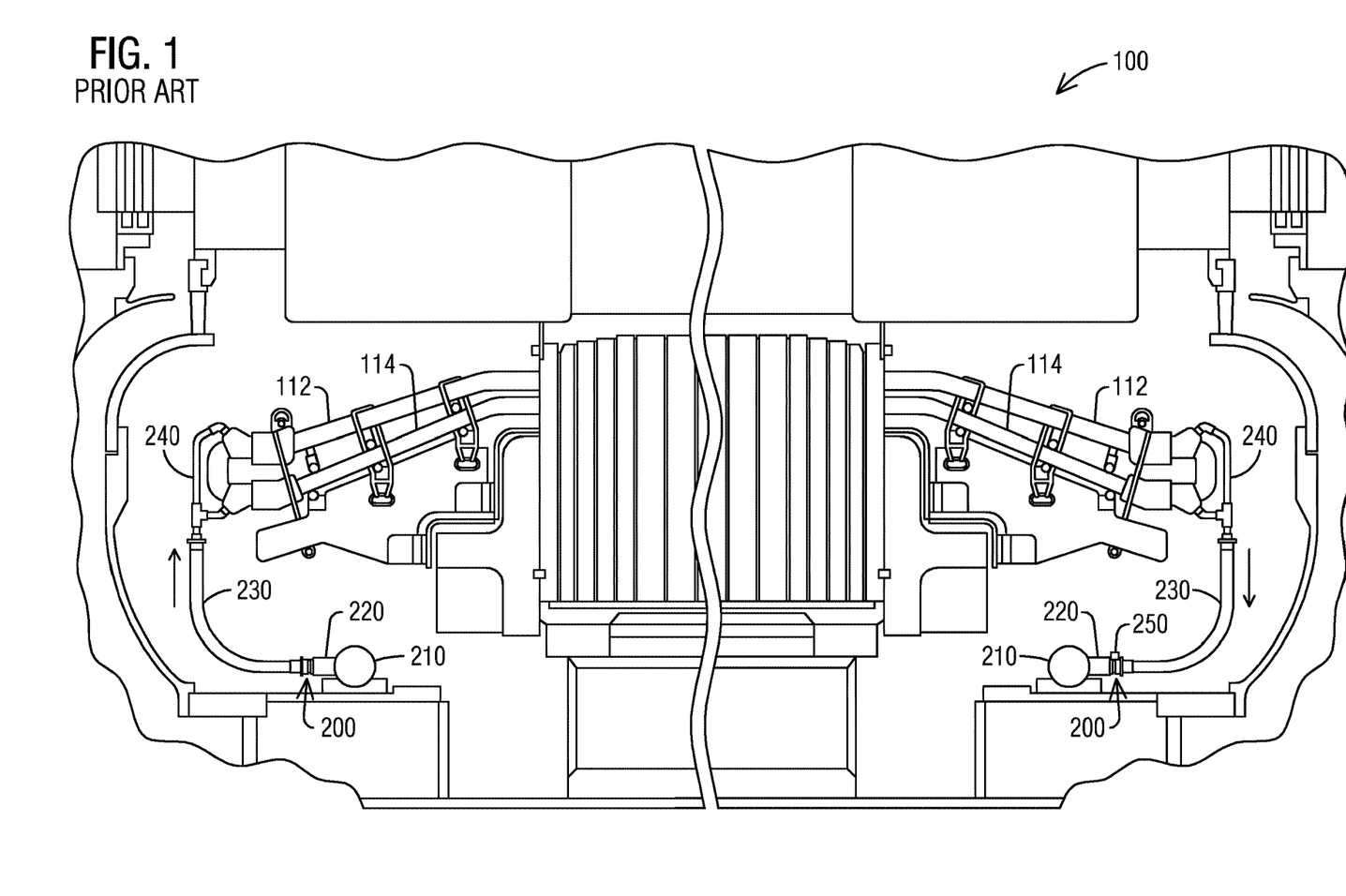
FIG. 1 illustrates a schematic cross section view of a generator stator having an existing manifold connection.

FIG. 1 illustrates a schematic cross section view of a generator stator 100 having an existing manifold connection 200. The generator stator 100 may include a top stator coil 112 and a bottom stator coil 114 passing through stator core slots (not shown) toward an inlet end side and an outlet end side. One manifold 210 may be arranged at the inlet end side and another manifold 210 may be arranged at the outlet end side. The manifolds 210 supply coolant for cooling the top stator coil 112 and the bottom stator coil 114. The manifolds 210 may be made of stainless steel. A sleeve 220 is connected to each of the manifold 210. The sleeve 220 may be made of stainless steel. The sleeve 220 may be welded to the manifold 210. As shown in FIG. 1, the existing manifold connection 200 include one hose 230 connected to the sleeve 220 at the inlet end side and another hose 220 connected to the sleeve 220 at the outlet end side. The hose 230 may be made of Teflon™. An end fitting 240 may be connected between the hose 230 and the end of the top stator coil 112 and the end of the bottom stator coil 114 at each end side. The end fitting 240 may be a T-fitting. The coolant may include liquid, such as water.

As illustrated in FIG. 1 with the existing manifold connection 200, coolant flows out from the manifold 210 at the inlet end side and enters into the one hose 230 through the sleeve 220. The end fitting 240 at the inlet end side splits the coolant from the one hose 230 to two separate flow paths to the end of the top stator coil 112 and the end of the bottom stator coil 114 separately. The coolant flows through the top stator coil 112 and the bottom stator coil 114 separately from the inlet end side to the outlet end side. The end fitting 240 at the outlet end side mergers the coolant of the top stator coil 112 and the bottom stator coil 114 into one flow path to the one hose 230 at the outlet end side. The coolant flows into the manifold 210 at the outlet end side through the sleeve 220. A thermal sensor 250 may be attached to the sleeve 220 at the outlet end side. The thermal sensor 250 measures temperature of the merged coolant from the top stator coil 112 and the bottom stator coil 114 at the outlet end side.

Figure 2:
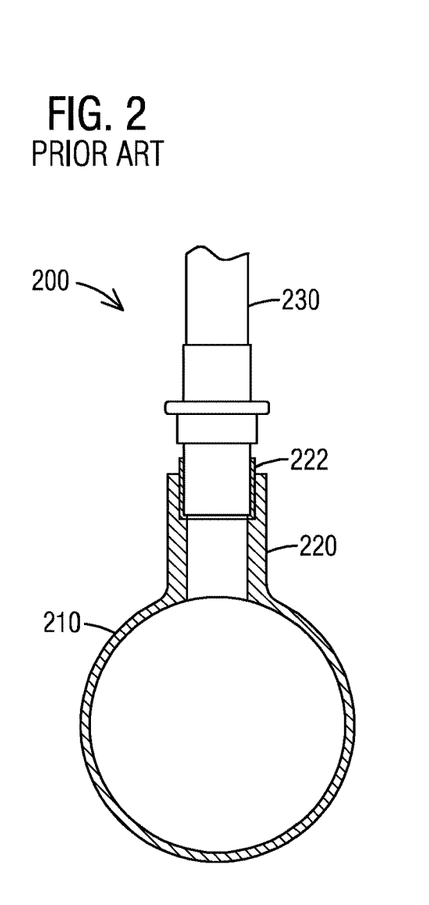
FIG. 2 illustrates a schematic enlarged cross section view of the existing manifold connection shown in FIG. 1.

FIG. 2 illustrates a schematic enlarged cross section view of the existing manifold connection 200 shown in FIG. 1. With reference to FIG. 2, the sleeve 220 may be welded to the manifold 210, such as by Tungsten Inert Gas welding. An insert 222 may be attached to inside of the sleeve 220. The insert 222 may be made of copper. The insert 222 may be brazed into the sleeve 220. The hose 230 may be connected to the sleeve 220 by inserting end of the hose 230 into the insert 222. Such a brazed joint hose connection may develop leakage over time and causes corrosion.

Figure 3:
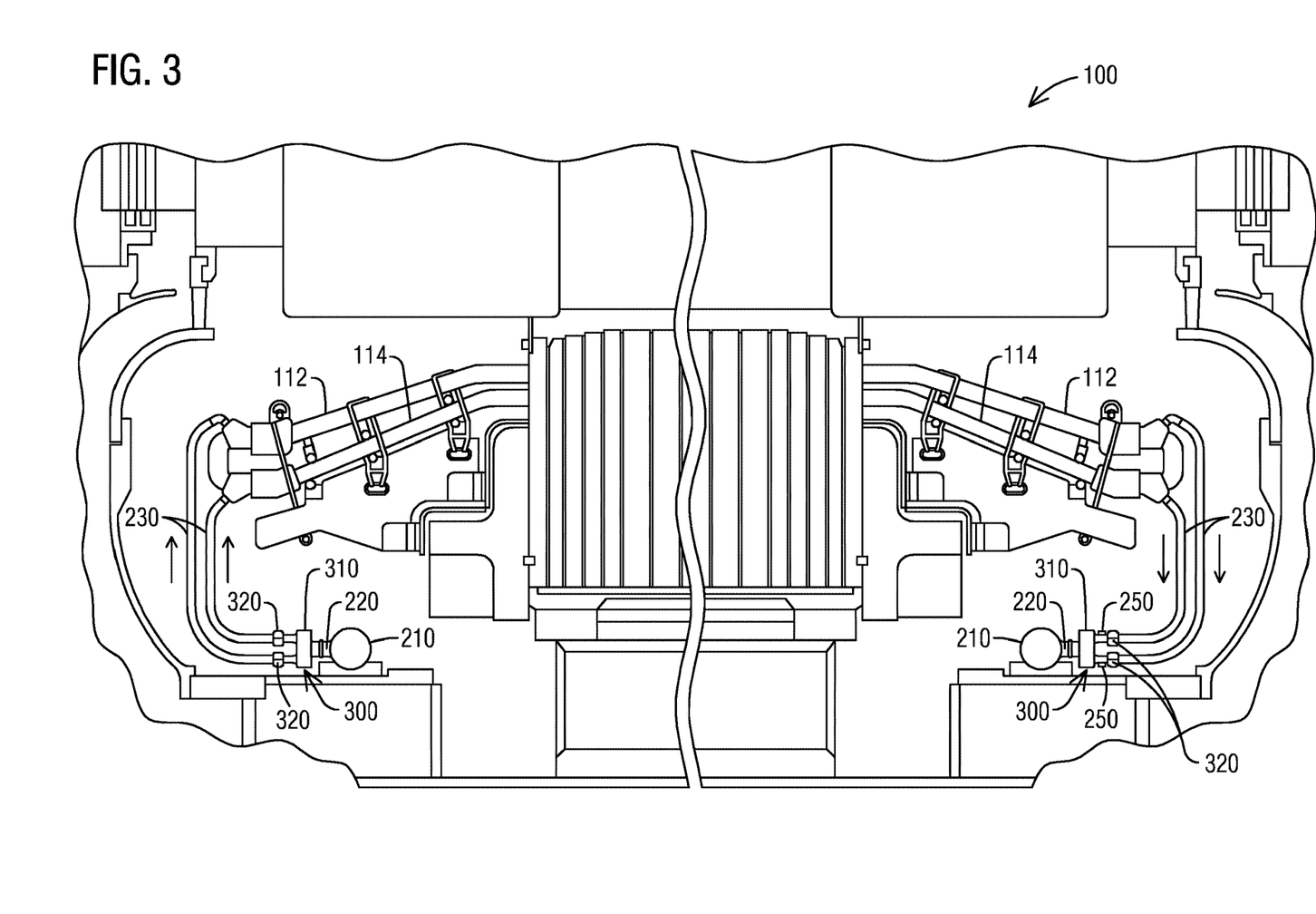
FIG. 3 illustrates a schematic cross section view of a generator stator having a manifold connection according to an embodiment of the invention.
Figure 4:
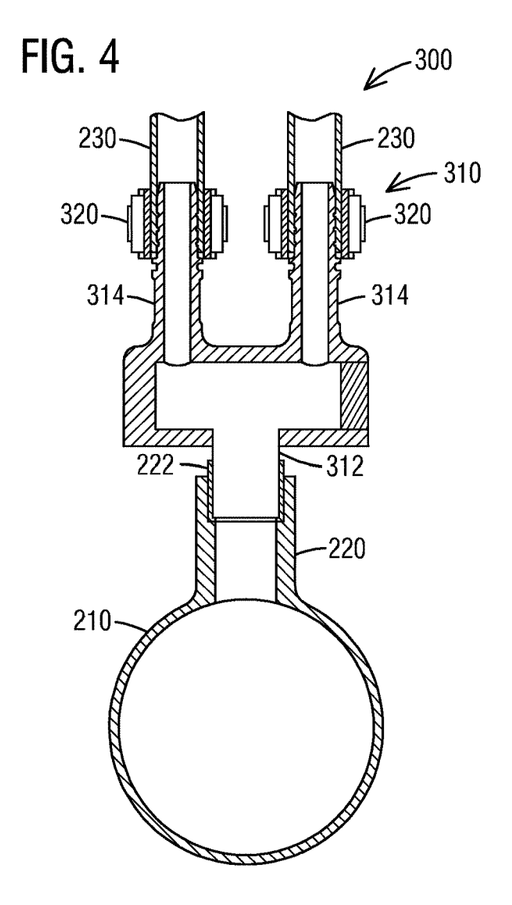
FIGS. 4 and 5 illustrate schematic enlarged cross section views of a manifold connection according to various embodiments of the invention.
Figure 5:
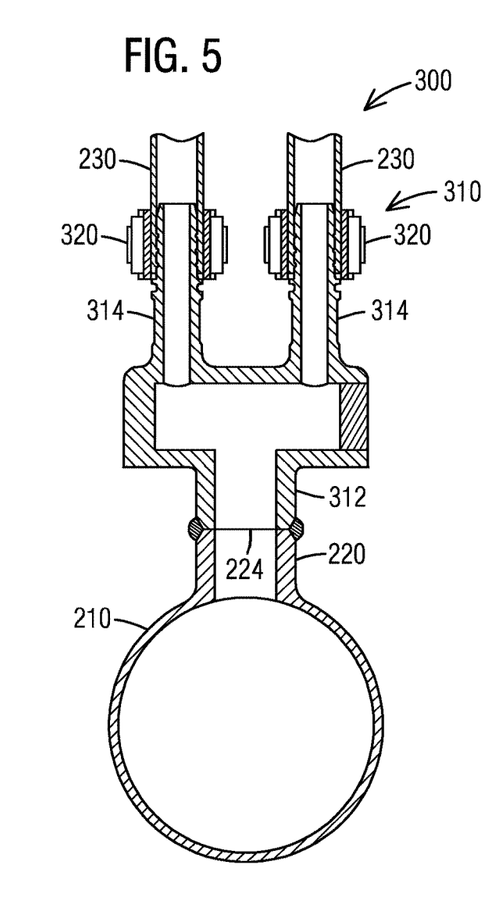

FIGS. 3-5 illustrate schematic cross section views of a generator stator 100 having a new manifold connection 300 according to embodiments of the invention. With reference to FIGS. 3-5, the new manifold connection 300 includes an adapter 310. The adapter 310 is arranged between the sleeve 220 and two hoses 230. The adapter 310 may be made of stainless steel. The adapter 310 may include a sleeve connection conduit 312. The sleeve connection conduit 312 may be attached to the sleeve 220. The adapter 310 may include two hose connection conduits 314. Two hoses 230 may be connected to the two hose connection conduits 314. The two hoses 230 may be fixed to the two hose connection conduits 314 by clamps 320. Coolant leakage may be prevented by fixing the two hoses 230 to the two hose connection conduits 314 using clamps 320. The two hoses 230 may be fixed to the two hose connection conduits 314 by other fixing means, such as brazed joint hose connections.

According to an exemplary embodiment as illustrated in FIG. 3, coolant flows out from the manifold 210 at the inlet end side and enters into the adapter 310 through the sleeve 220 and the sleeve connection conduit 312. The coolant flows into two hoses 230 through the two hose connection conduits 314 of the adapter 310. The two separate hoses 230 connect to end of the top stator coils 112 and end of the bottom stator coils 114 separately. The coolant flows through the top stator coil 112 and the bottom stator coil 114 separately from the inlet end side to the outlet end side. The coolant enters into two hoses 230 from the top stator coils 112 and the bottom stator coils 114 at the outlet end side. The two separate hoses 230 are connected to two hose connection conduits 314 of an adapter 310 at the outlet end side. The coolant flows into the adapter 310 at the outlet end side through the two hoses 230 and the two connection conduits 314. Two thermal sensors 250 may be respectively attached to the two hose connection conduits 314. The two thermal sensors 250 may be attached to the two hose connection conduits 314 by tapes or epoxy resin. The two thermal sensors 250 measure temperature of coolant from the top stator coil 112 and temperature of coolant from the bottom stator coil 114 separately at the outlet end side. The coolant flows into the manifold 210 at the outlet end side through the sleeve 220 and the sleeve connection conduit 312 of the adapter 310.

FIGS. 4-5 illustrate schematic enlarged cross section views of a new manifold connection 300 according to various embodiments of the invention. With reference to FIG. 4, the adapter 310 may be attached to the sleeve 220 by inserting the sleeve connection conduit 312 into the sleeve 220. For example, the sleeve 220 may have an insert 222. The insert 222 may be brazed into the sleeve 220. The adapter 310 may be attached to the sleeve 220 by inserting the sleeve connection conduit 312 into the insert 222 of the sleeve 220. With reference to FIG. 5, the adapter 310 may be attached to the sleeve 220 by welding the sleeve connection conduit 312 to the sleeve 220 at location 224. The welding connection may provide advantage of leakage protection.

According to the embodiments of the invention, the new manifold connection 300 using an adapter 310 provides two separate hose conduit connections 314 from one single sleeve 220 connected to a manifold 210. The new manifold connection 300 allows two hoses 230 to be separately connected between the top stator coil 112 and the bottom stator coil 114 to a manifold 210 through one single sleeve 220. Temperatures of coolant flowing through the top stator coil 112 and the bottom stator coil 114 may be measured separately by two separate thermal sensors 250 attached to the two separate hose conduit connections 314 of the adapter 310. The new manifold connection 300 provides advantages of monitoring operation of a generation stator 100.

During generator stator coil rewinding of an existing generator stator 100, such as a generator stator 100 having a configuration shown in FIG. 1, design of the rewinding stator coils may be different than an existing stator coils in the existing generator stator 100. According to aspects of the invention, an existing manifold connection 200 in the existing generator stator 100 may be modified to the new manifold connection 300 so that ends of rewinding top stator coil 112 and rewinding bottom stator coil 114 may be connected to an existing manifold 210. The modification includes removing the one hose 230 from the sleeve 220 in the existing manifold connection 200. Referring to FIG. 2 and FIG. 4, the hose 230 may be removed from the insert 222 of the sleeve 220. The adapter 310 may be attached to the sleeve 220 by inserting the sleeve connection conduit 312 into the insert 222 of the sleeve 220. Referring to FIG. 2 and FIG. 5, the hose 230 may be removed by cutting the sleeve 220 in the existing manifold connection 200 at a location 224 between the insert 222 and the manifold 210. The adapter 310 may be attached to the sleeve 220 by welding the sleeve connection conduit 312 to the sleeve 220 at the cutting location 224. The welding connection may provide an advantage of leakage protection. The modification includes attaching an adapter 310 to the sleeve 220 through a sleeve connection conduit 312. The modification includes connecting two hoses 230 to two hose connection conduits 314 of the adapter 310. The two hoses 230 may be connected to end of rewinding top stator coil 112 and end of rewinding bottom stator coil 114 separately.

According to aspects of the invention, an existing manifold connection 200 in an existing generator stator 100 may be modified to the new manifold connection 300 so that existing top stator coil 112 and existing bottom stator coil 114 may be connected to two hoses 230 separately. Two thermal sensors 250 may be attached to the two hose connection conduits 314 of the adapter 310 at an outlet side so that the coolant temperatures of the top stator coil 112 and the bottom stator coil 114 may be measured independently. Referring to FIG. 1, the existing generator stator 100 may include end fittings 240 at end of the existing top stator coil 112 and end of the existing bottom stator coil 114. End fittings 240 may not be needed with the new manifold connection 300 and may be removed. Removal of end fittings 240 may improve vibration behavior of top stator coil 112 and bottom stator coil 114.

According to the embodiments of the invention, modification of an existing manifold connection 200 using an adapter 310 provides two separate hose conduit connections 314 from one single sleeve 220 connected to an existing manifold 210 without replacing the existing manifold 210, or without changing design of a generator stator coil during stator coil rewinding. The adapter 310 provides two separate coolant flow paths from the one single sleeve 220 of the manifold 210 to the top stator coil 112 and the bottom stator coil 114 through the two hoses 230.

Figure 6A:
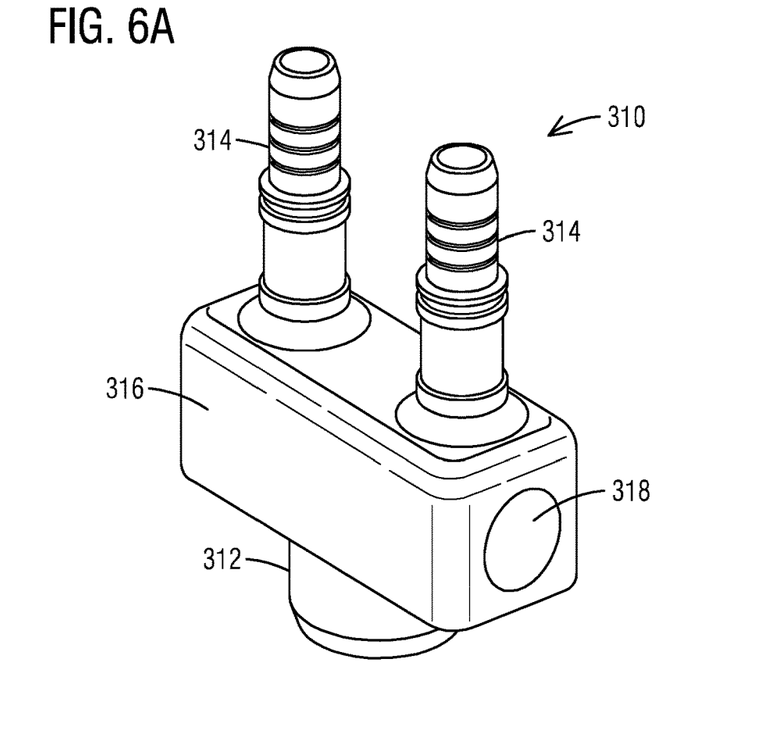
FIGS. 6A and 6B illustrate schematic perspective and cross section views of an adapter according to an embodiment of the invention.
Figure 6B:
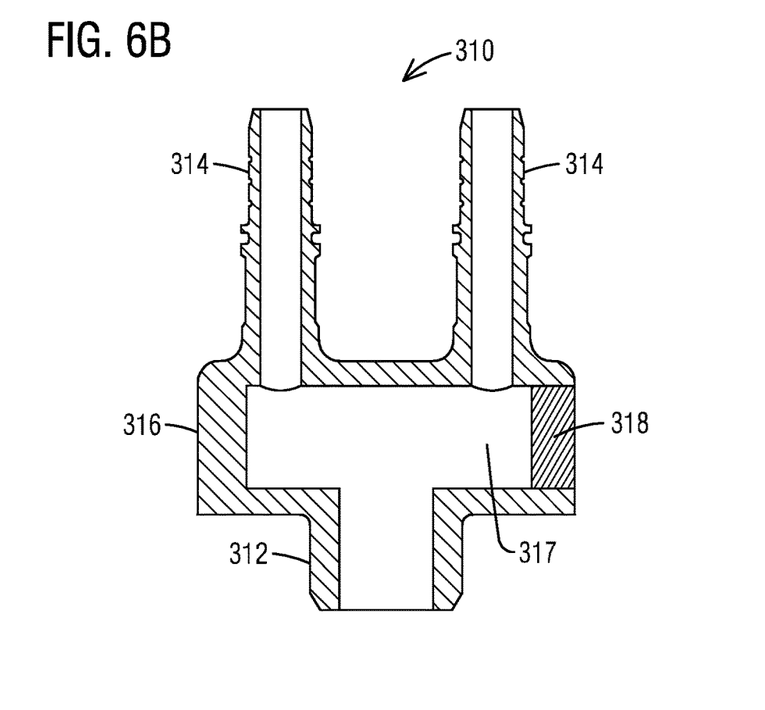
Figure 7A:
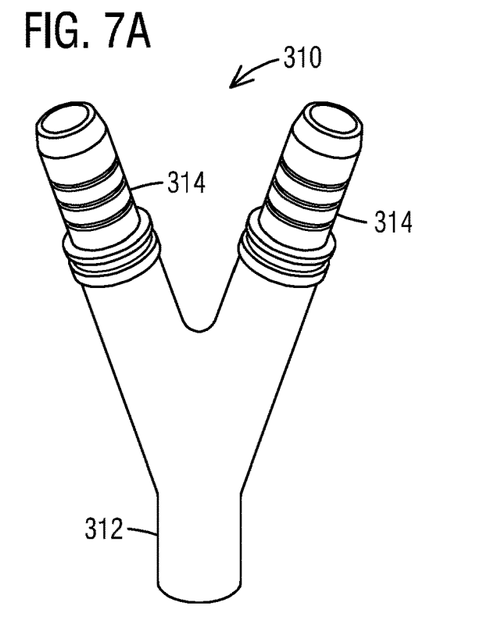
FIGS. 7A and 7B illustrate schematic perspective and cross section views of an adapter according to an alternative embodiment of the invention.
Figure 7B:
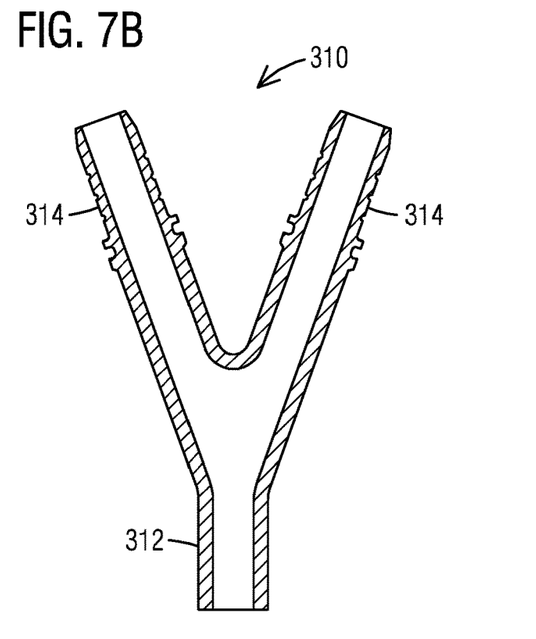
Figure 8A:
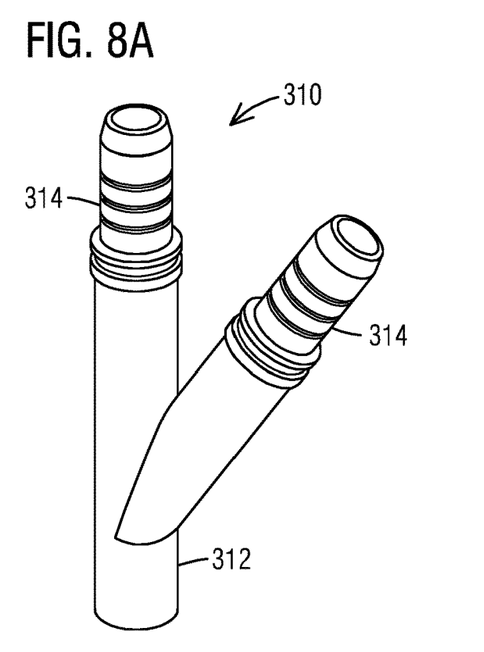
FIGS. 8A and 8B illustrate schematic perspective and cross section views of an adapter according to a further alternative embodiment of the invention.
Figure 8B:
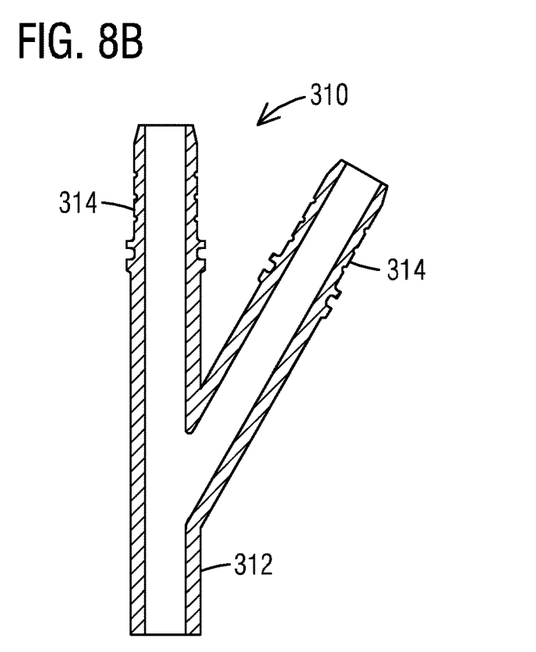

Various embodiments of an adapter 310 are illustrated in FIGS. 6-8. With reference to FIGS. 6A and 6B, the adapter 310 may include a chamber 316 between the sleeve connection conduit 312 and the two hose connection conduits 314. The sleeve connection conduit 312 may be welded or machined to the chamber 316. The two hose connection conduits 314 may be welded or machined to the chamber 316. The chamber 316 may have a shape, such as a cuboid, a cube, a cone, a cylinder, or a sphere. In the exemplary embodiment as illustrated in FIGS. 6A and 6B, the chamber 316 has a square prism shape. The chamber 316 may have a plenum 317 inside. The plenum 317 may be drilled from one side of the chamber 316. A plug 318 may be attached to the chamber 316 to seal the plenum 317.

With reference to FIGS. 7A and 7B, the adapter 310 may have a Y-shape. The Y-shaped adapter 310 has a sleeve connection conduit 312 and two hose connection conduits 314 symmetrically branching out from the sleeve connection conduit 312.

With reference to FIGS. 8A and 8B, the adapter 310 may have a Wye-shape. The Wye-shaped adapter 310 has a sleeve connection conduit 312 and one hose connection conduit 314 straightly extending out from the sleeve connection conduit 312 and the other hose connection conduit 314 branching out from the sleeve connection conduit 312.

According to an aspect, the proposed manifold connection 300 may connect two hoses 230 to one sleeve 220 of a manifold 210. The proposed manifold connection 300 may allow connecting a stator coil having a different design to an existing manifold 210 during stator coil rewinding. The proposed manifold connection 300 may provide a simple modification to resolve connection issues between generator stator coils and manifold 210 during stator coil rewinding, and thus significantly reduces cost during stator coil rewinding.

According to an aspect, the proposed manifold connection 300 may replace leak-prone brazed joint hose connection by welding and clamping.

According to an aspect, the proposed manifold connection 300 may allow measuring coolant temperatures of the top stator coil 112 and the bottom stator coils 114 independently by attaching two thermal sensors 250 to two hose connection conduits 314 separately. The proposed manifold connection 300 may provide better fault detection of stator coil without attaching additional thermal sensors between the top stator coils 112 and the bottom stator coils 114.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

REFERENCE LIST

100: Generator Stator
112: Top Stator Coil
114: Bottom Stator Coil

200: Existing Manifold Connection
210: Manifold
220: Manifold Sleeve
222: Sleeve Insert
224: Sleeve Cutting Location
230: Hose
240: End Fitting
250: Thermal Sensor
300: New Manifold Connection of the Invention
310: Adapter
312: Sleeve Connection Conduit
314: Hose Connection Conduit
316: Chamber
317: Plenum
318: Plug
320: Clamp What claimed is:

1. A method for retrofitting, wherein an end of a generator stator coil is connected with a manifold via an end fitting and a single hose, wherein the stator coil comprises a top stator coil and a bottom stator coil, the end fitting combines two separate flow paths of the top stator coil and the bottom stator coil to a single flow path, wherein the single hose is connected to the end fitting at the single flow path, and the hose is connected to a manifold, the method comprising:

disconnecting the end fitting from the top stator coil and the bottom stator coil;

disconnecting the single hose from the manifold;

attaching an adapter to a sleeve of the manifold, wherein the adapter comprises a sleeve connection conduit configured to be attached to the sleeve, and wherein the adapter further comprises two hose connection conduits; and connecting two hoses between the two hose connection conduits of the adapter and an end of the top stator coil and an end of the bottom stator coil respectively, and attaching a thermal sensor to each of the two hose connection conduits, wherein a coolant temperature of the top stator coil and the bottom stator coil may be measured individually, wherein the adapter is arranged between the sleeve and the two hoses for providing two separate coolant flow paths from the sleeve connected to the manifold to the top stator coil and the bottom stator coil through the two hoses, and wherein two separate flow paths between the stator coil and the adapter are provided without replacing the manifold.

2. The method as claimed in claim 1, wherein the adapter is attached to the sleeve by inserting into the sleeve or by welding to the sleeve.

3. The method as claimed in claim 2, wherein the adapter is attached to the sleeve by welding to the sleeve.

4. The method as claimed in claim 1, wherein the adapter further comprises a chamber between the sleeve connection conduit and the two hose connection conduits.

5. The method as claimed in claim 1, wherein the adapter further comprises a plug to seal a plenum inside the chamber.

6. The method as claimed in claim 1, wherein the adapter has a Y-shape with the two hose connection conduits symmetrically branching out from the sleeve connection conduit.

7. The method as claimed in claim 1, wherein the adapter has a Wye-shape with one hose connection conduit straightly extending out from the sleeve connection conduit and the other hose connection conduit branching out from the sleeve connection conduit.

8. The method as claimed in claim 1, wherein the adapter is attached to the sleeve by inserting into the sleeve.

* * * * *